United States Patent
Danger et al.

(10) Patent No.: US 6,651,679 B2
(45) Date of Patent: Nov. 25, 2003

(54) PROCESS FOR THE BREAKING AND CLEANING OF CONTAMINANT-CONTAINING RAW PAPER STOCKS, IN PARTICULAR OF RECOVERED PAPER

(75) Inventors: Michael Danger, Salem (DE); Peter Respondek, Ravensburg (DE); Reimund Rienecker, Heidenheim (DE); Samuel Schabel, Ravensburg (DE)

(73) Assignee: Voith Paper Patent GmbH, Heidenheim (DE)

( * ) Notice: Subject to any disclaimer, the term of this patent is extended or adjusted under 35 U.S.C. 154(b) by 56 days.

(21) Appl. No.: 10/014,370

(22) Filed: Dec. 14, 2001

(65) Prior Publication Data

US 2002/0074021 A1 Jun. 20, 2002

(30) Foreign Application Priority Data

Dec. 16, 2000 (DE) .......................................... 100 63 014

(51) Int. Cl.⁷ .......................... B02C 23/10; B02C 23/12; B02C 23/13; B02C 23/18; B08B 3/04
(52) U.S. Cl. ......................... 134/25.1; 134/33; 134/16; 241/28; 241/29
(58) Field of Search ........................... 134/16, 25.1, 33; 241/20, 21, 24.1, 24.11, 25, 24.19, 28, 29, 78

(56) References Cited

U.S. PATENT DOCUMENTS

| 4,387,856 A | 6/1983 | Selder |
| 4,397,713 A | 8/1983 | Lambrecht |
| 4,538,767 A | * 9/1985 | Pimley ....................... 241/79.3 |
| 4,592,513 A | 6/1986 | Musselmann et al. |
| 4,641,790 A | 2/1987 | Musselmann et al. |
| 6,245,195 B1 | * 6/2001 | Marwah ........................ 162/5 |

FOREIGN PATENT DOCUMENTS

| DE | 2949029 | 5/1981 |
| DE | 3334448 | 4/1984 |
| EP | 0147564 | 7/1985 |
| GB | 2061343 | 5/1981 |

* cited by examiner

Primary Examiner—Zeinab El-Arini
(74) Attorney, Agent, or Firm—Greenblum & Bernstein, P.L.C.

(57) ABSTRACT

Process for the disintegration and cleaning of contaminant-containing raw paper stocks. The process includes producing a contaminant-containing suspension, feeding the contaminant-containing suspension to a closed coarse screen, drawing of a cleaned flow fraction from the closed coarse screen, and drawing off an overflow fraction containing an increased amount of contaminants from the coarse screen during at least about 80% of an operating time. The process also includes adjusting a volumetric mass flow of the overflow fraction to at least about 15% and maximally about 50% of a volumetric mass flow of an inflow into the coarse screen, and feeding the overflow fraction to a screening device, in which contaminants collected are sluiced out discontinuously as a further overflow fraction, thereby forming a further cleaned flow fraction.

31 Claims, 3 Drawing Sheets

PROCESS FOR THE BREAKING AND CLEANING OF CONTAMINANT-CONTAINING RAW PAPER STOCKS, IN PARTICULAR OF RECOVERED PAPER

CROSS REFERENCE TO RELATED APPLICATIONS

The present application claims priority under 35 U.S.C. §119 of German Patent Application No. 100 63 014.6 filed on Dec. 16, 2000, the disclosure of which is expressly incorporated by reference herein in its entirety.

BACKGROUND OF THE INVENTION

1. Field of the Invention

The invention relates to a process for the breaking and cleaning of contaminant-containing raw paper stocks, e.g., recovered paper, in which a disintegration apparatus is used to produce a contaminant-containing suspension. The contaminant-containing suspension is fed to a closed coarse screen, from which a cleaned flow fraction is drawn off as well as an overflow fraction that contains an increased amount of contaminants.

2. Discussion of Background Information

As is known, raw paper stocks that contain a smaller or larger percentage of contaminants are used to a great extent for paper manufacture. Such contaminants are predominantly pieces of plastic and plastic foils, wires, pieces of metal, broken glass, sand, etc. The contaminants should, of course, be removed as completely as possible, i.e., to protect the machines used for the processing from wear and because of the quality demands on the paper produced later.

Processes have proved effective in which the raw paper stock is first broken at a solids content of above 8 percent. This means that after mixing with water, the raw paper stock is dispersed by mechanical processing, whereby the raw paper stocks disintegrate as a result of their swelling, while a large part of the contaminants retain their firmness. Thus, e.g., plastic foils remain in relatively large pieces, and the paper webs can be broken down into individual fibers or lumps. When this state is reached, further water is added so that a suspension is formed that is, as a rule, capable of being pumped and contains a relatively high percentage of contaminants. As a result, the subsequent screening apparatus receives a strongly contaminated suspension. Fiber constituents that no longer contain any coarse contaminants can be drawn off as accepted stock fractions through the screen contained therein, so that the suspension remaining behind inside the screening apparatus, i.e., that is not carried away as accepted stock, is constantly enriched with contaminants. This can lead to operating trouble and loss of quality due to the reduced screening effect. If such screening apparatuses are rinsed in cycles, the continuity of the manufacturing process suffers. Thus relatively large machines are required.

SUMMARY OF THE INVENTION

The present invention provides a process that renders possible a secure trouble-free operation even in the presence of quite large amounts of contaminants.

According to the invention, the overflow fraction is drawn off from the coarse screen during at least about 80% of the operating time. In this manner, a volumetric mass flow of the overflow fraction is adjusted to at least about 15% and maximally about 50% of a volumetric mass flow of the inflow into the coarse screen. Further, the overflow fraction is fed to a further screening device from which the collected contaminants are sluiced out discontinuously as an overflow fraction to form a further cleaned flow fraction.

The operation of the plant implementing the process is substantially improved by the described measures. It is in fact possible to draw off an already well-cleaned accepted stock at the coarse screen, which stock is preferably available continuously, e.g., as a rule uninterruptedly. During the sluicing of the subsequent screening device, the coarse screen takes over the entire production. Although the accepted stock of the screening device used subsequently is not produced continuously, it is quantitatively less. Its screening quality can be set by appropriate parameters so that it can be conducted forwards.

The instant invention is directed to a process for the disintegration and cleaning of contaminant-containing raw paper stocks. The process includes producing a contaminant-containing suspension, feeding the contaminant-containing suspension to a closed coarse screen, drawing of a cleaned flow fraction from the closed coarse screen, and drawing off an overflow fraction containing an increased amount of contaminants from the coarse screen during at least about 80% of an operating time. The process also includes adjusting a volumetric mass flow of the overflow fraction to at least about 15% and maximally about 50% of a volumetric mass flow of an inflow into the coarse screen, and feeding the overflow fraction to a screening device, in which contaminants collected are sluiced out discontinuously as a further overflow fraction, thereby forming a further cleaned flow fraction.

In accordance with a feature of the instant invention, the contaminant-containing suspension can be produced in a disintegration apparatus. Further, the contaminant-containing raw paper stocks may include recovered paper.

According to another feature of the invention, the overflow fraction can be drawn off from the coarse screen at least until no more contaminants are sluiced from the screening device.

According to still another feature of the present invention, the flow fraction may be continuously drawn off from the coarse screen.

Further, the sluicing of contaminants out of the screening device may include halting the feeding of the overflow fraction into the screening device and, while the feeding is halted, pumping a rinsing jet into the screening device. The rinsing jet can cause the contaminants to flow off from the screening device as the further overflow fraction.

In accordance with a further feature of the invention, during the sluicing, the entire residue collected in the screening device can be removed.

A discharge of the further cleaned flow fraction from the screening device may be blocked from the coarse screen while the sluicing is taking place.

The further cleaned flow fraction from the screening device can be combined with the cleaned flow fraction from the coarse screen.

Moreover, the further overflow fraction of the screening device can be conducted into a screening drum in which a reject fraction is formed as an overflow.

According to another feature of the invention, the flow fraction through the screening drum may be returned into the disintegration apparatus.

Further, the further overflow fraction from the screening device can be thickened in a press.

The volumetric mass flow of the overflow fraction can be adjusted at the coarse screen to correspond to between about 20% and about 30% of the volumetric mass flow of the inflow into the coarse screen.

Further, a mass flow of fibrous material in the further overflow fraction may be adjusted at the screening device so that it amounts to about 20% to about 30% of a mass flow of fibrous material in an inflow to the screening device.

In accordance with still another feature of the instant invention, the coarse screen may include a screen with an aperture size of maximally about 4 mm.

According to a further feature of the invention, the coarse screen can include a flat screen kept clear by a moving screen scraper.

Further still, the contaminant-containing suspension may be centrally introduced into the coarse screen.

According to a still further feature of the invention, heavy particles can be separated at the coarse screen via a heavy particle sluice.

Still further, a breaking apparatus may be arranged upstream of the coarse screen to produce the contaminant-containing suspension, and no contaminants are removed between the breaking apparatus and the coarse screen.

The process may also include rejecting coarse contaminants at a screen perforation of maximally about 30 mm diameter between disintegration apparatus producing the contaminant-containing suspension and the coarse screen. The coarse contaminants may be removed with a rotating screening drum having a perforation size of maximally about 30 mm.

According to still another feature of the present invention, a disintegration apparatus produces the contaminant-containing suspension.

According to a further feature of the invention, the disintegration apparatus can include a dissolving tank. An axial continuation of the dissolving tank may be structured and arranged as a screening part. Further, the axial continuation of the dissolving tank can be utilized as a screening drum. Still further, the dissolving tank can be operated such that a continuous flow of disintegrated material accumulates, and the accumulated disintegrated material is diluted with dilution water to produce the contaminant-containing suspension.

In accordance with a still further feature of the instant invention, the disintegration apparatus can include a high-consistency pulper. Further, the high-consistency pulper can be operated discontinuously and that at the end of a breaking cycle a desired consistency for the coarse screen is established by adding dilution water.

According to still another feature of the invention, an inside volume on a feed side of the coarse screen can be at least about 15% of a volume that the volumetric mass flow of the cleaned flow fraction fills in one minute.

In accordance with still yet another feature of the present invention, an inside volume on an feed side of the screening device may be at least about 30% of a volume that a volumetric mass flow of the further cleaned flow fraction fills in one minute.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
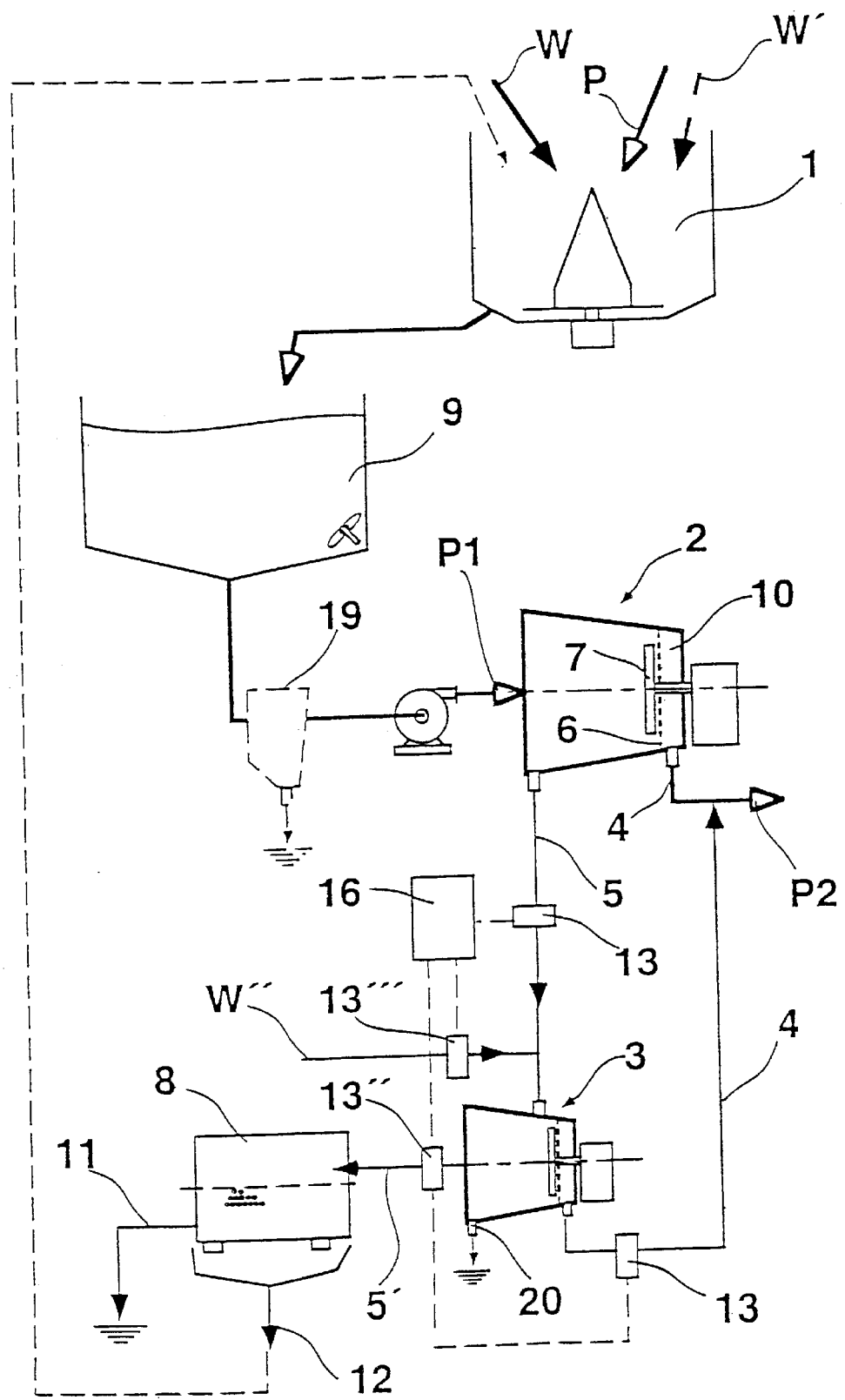
FIG. 1 illustrates shows a diagram of a plant suitable for performing the process of the instant invention.

FIG. 1 shows a high-consistency pulper 1, into which raw paper stock P and water W are fed. Raw paper stock P is mixed with water W in a per se known manner and is worked mechanically by a rotor at a solids content of at least about 8%. After a certain period of time, further dilution water W' is added to the pulper, resulting in a suspension of below about 8%, which is then collected in a batch tank 9. From there it is pumped off, preferably continuously, and reaches first a heavy particle separator 19 and then, as suspension P1, reaches coarse screen 2. Heavy particle separator 19, which is drawn only with a dashed line, can be omitted if the system handles the coarse contaminants contained after the slushing. Coarse screen 2 contains at least one screen 6, here designed as a flat screen, that is kept clear of clogs by a rotor 7. The suspension that has passed screen 6 collects in accepted stock chamber 10 and is drawn off as flow fraction 4. Inside a coarse screen of this design, a swirling flow norm-ally forms and produces a suction in its center on the side opposite rotor 7. In certain cases this suction can be utilized to introduce the suspension P1 from the high-consistency pulper, even without a (wear-susceptible) pump.

Overflow fraction 5 of coarse screen 2 is next conducted into a further screening device 3. This is constructed in a similar way to coarse screen 2, but here exhibits a tangential inflow at the outer circumference. In this screening device 3, a flow fraction 4' is also formed with the aid of a screen, as well as a residue of materials rejected at the screen. The residue is sluiced discontinuously from screening device 3 as an overflow fraction 5'. This can take place e.g. in that a control device 16 controls the valves 13, 13', 13<, 13'''. When the contents of the screening device 3 are so enriched with contaminants that they should be sluiced out, valves 13 and 13'' close and valves 13'' and 13''' open. A rinsing jet W'' flows in through valve 13'''. This procedure is advantageously maintained until the entire residue collected in screening device 3 has been removed. Valve 13 is normally kept closed throughout the sluicing. This means that during this period no overflow 5 is drawn off from coarse screen 2. Efforts must be made to adjust this period to be as short as possible (a continuous drawing off of rejects, as it were) in order-to-keep the contaminant-concentration in the coarse screen within narrow limits. The process is therefore run so that overflow fraction 5 is removed over a period of at least about 80% of the operating time of the coarse screen.

Figure 2:
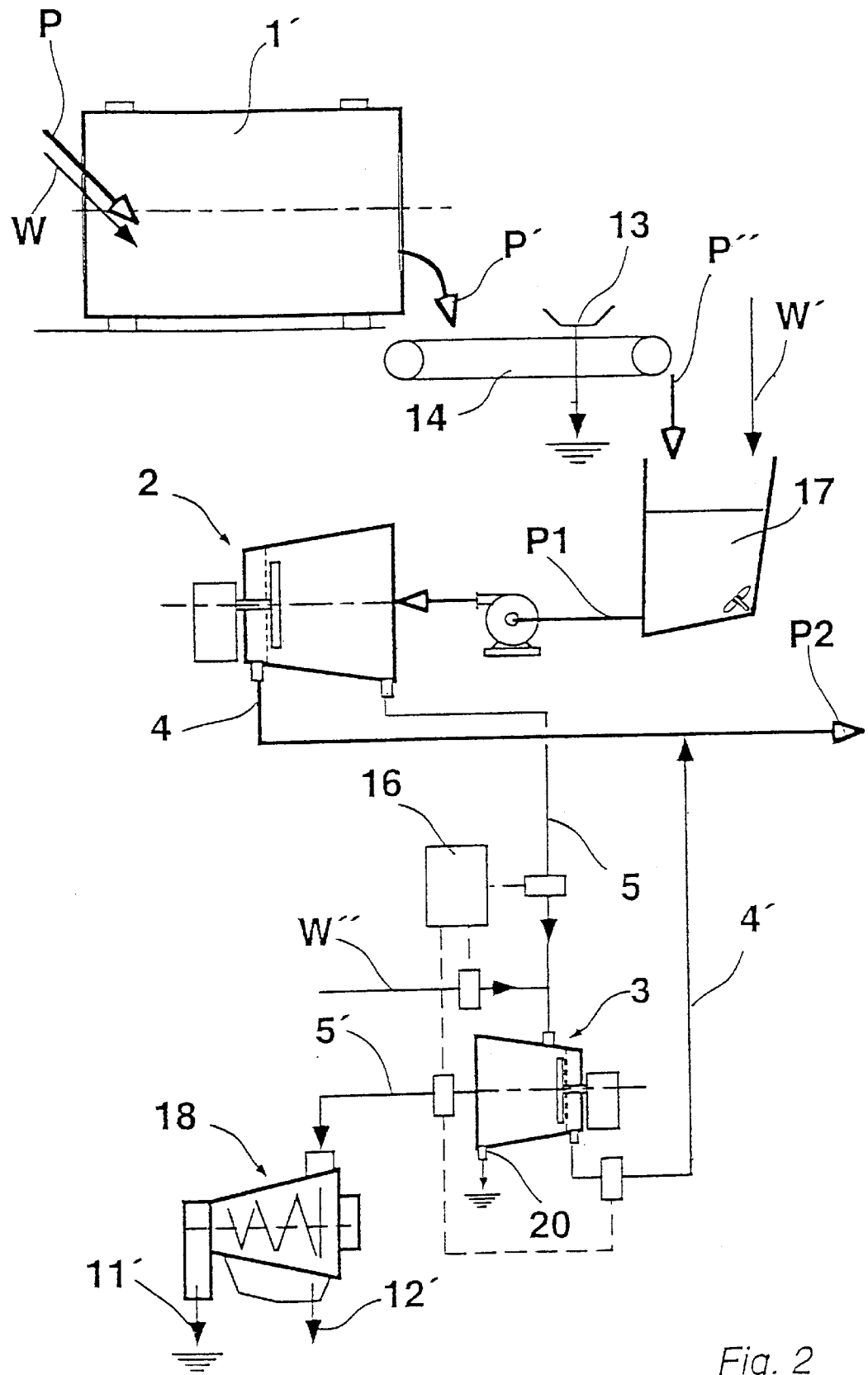
FIG. 2 illustrates a modification of the plant depicted in FIG. 1 with a dissolving tank.

As shown here, overflow fraction 5' of screening device 3 can flow off into a screening drum 8, in which the reject fraction 11 is formed as an overflow and a flow fraction 12 is formed containing mainly water and possibly fibrous material. As shown in FIG. 2 in greater detail, other methods for disposal from screening device 3 are also conceivable. Pieces of metal, stones, etc. are separated by means of a heavy particle sluice 20.

In order to prevent quite large amounts of paper fibers from flowing off with the overflow fraction 5' during the sluicing, a rinsing cycle can be carried out before the contaminants are sluiced out. For this, valves 13 and 13" must be closed, while the other valves 13', 13'" are opened. Thus with the aid of the rinsing jet W", the fibers reach flow 4' of screening device 3.

In the plant shown in FIG. 2, raw paper stock P is first mixed with water W in a dissolving tank 1' and is broken. Such a dissolving tank preferably works continuously, so that a constant flow of broken pulp P' overflows at the axial end opposite the inflow. This is strongly loaded with contaminants as a rule. In order to remove at least the coarsest contaminants, it is conducted past a metal detector 13 on a distributing belt 14. The coarse cleaning stage shown is to be understood as only one of various possibilities. It can also be omitted if coarse screen 2 is suitable for processing the accumulating contaminants without interruption. In order to enable further processing of the disintegrated and if necessary pre-cleaned pulp P", it is mixed with further dilution water W' in a mixing tank 17 until a pumpable suspension P1 is formed, which is fed to a coarse screen 2 in the manner already described. Further processing of the-suspension-takes place in a similar way as already described in FIG. 1. The difference, however, is that here a press is used for overflow fraction 5' of screening device 3, with whose aid a reject 11' can be formed that is suitable for dumping. In this case, however, the already mentioned rinsing cycle is advisable. Pressed-out water 12' can be re-used, e.g., for slushing or diluting.

Figure 3:
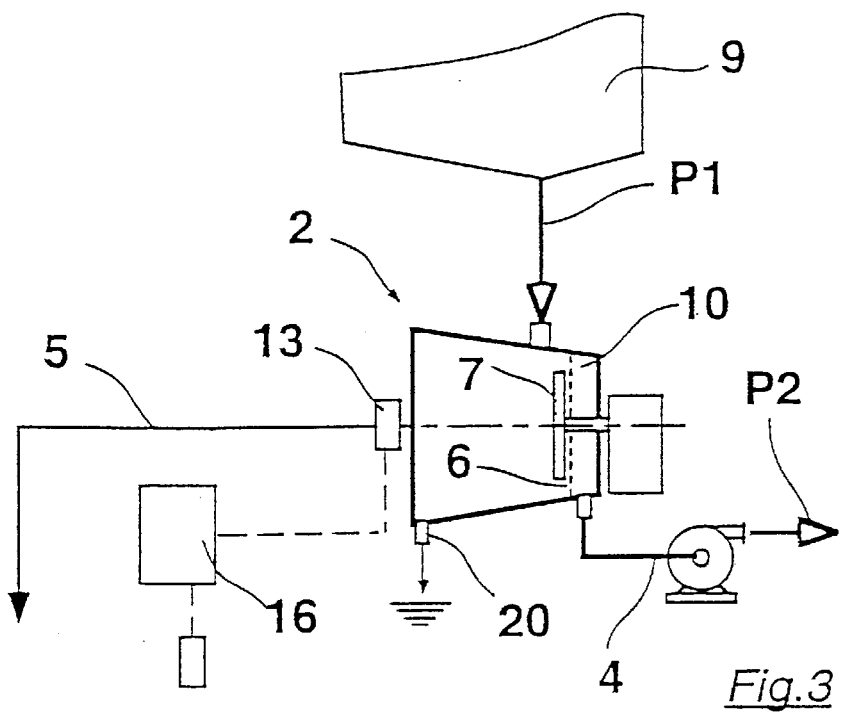
FIG. 3 illustrates a modification of the coarse screen utilized in the plant.

As the example of FIG. 3 shows, a coarse screen can also be constructed so that the inflow of suspension P1 takes place tangentially to the outer edge of the housing. It depends on the quality of raw paper stock P and the process parameters, how large the heavy particles are that are entrained with suspension P1. Thus, uses of the process are also conceivable in which it is possible to carry all the heavy particles contained directly into coarse screen 2, without first having to remove part of them. The rotating movement of the suspension inside the housing causes the heavy particles to rotate at the inside wall and to be concentrated due to the centrifugal force. These particles can then be conducted out through a heavy particle sluice 20 relatively quickly, so that the wear and tear caused by them remains low and breakdowns do not occur. The effect of the heavy particle separation can be further accelerated by a conical housing. Although the described heavy particle sluice 20 is also possible when the suspension is introduced centrally into such a device, more rapid separation may also be achievable with a tangential inflow.

Figure 4:
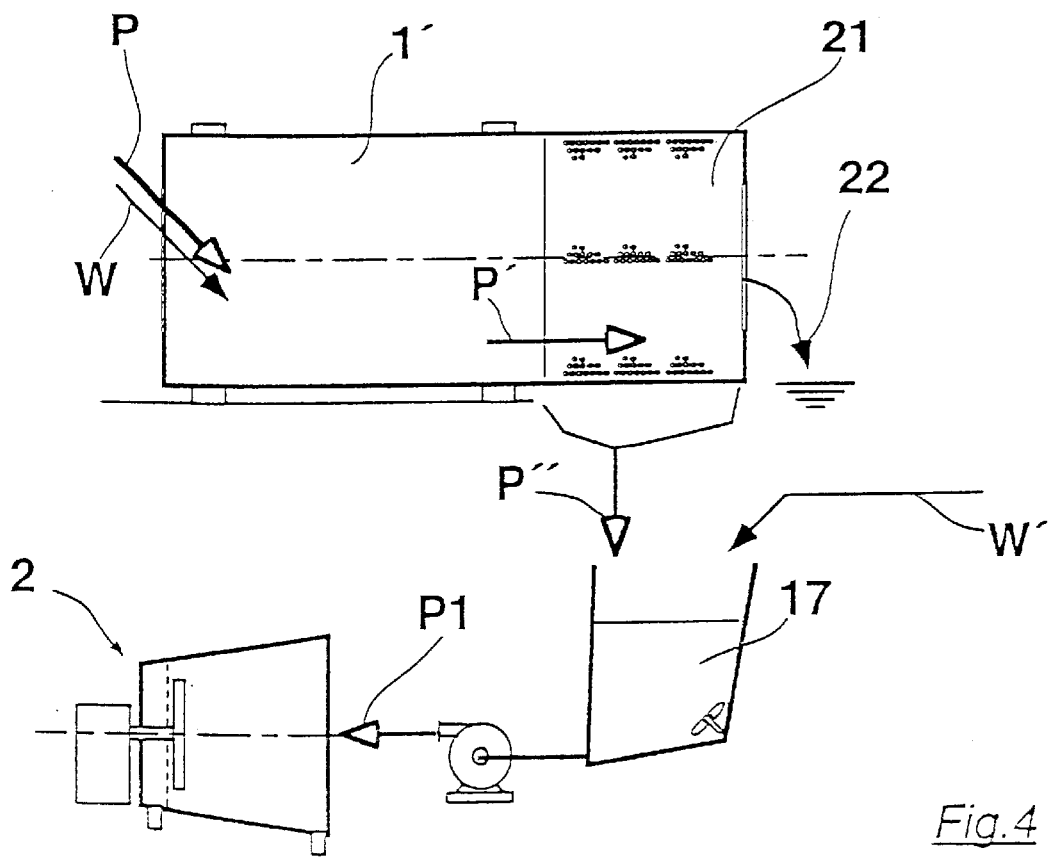
FIG. 4 illustrates an example for primary screening of the disintegrated fibrous material.

FIG. 4 shows a special embodiment of the process of the invention in which a dissolving tank 1' is again used as the dissolving apparatus. In the form shown, the dissolving tank 1' continues axially with a screening part 21. The broken pulp P' therefore reaches screening part 21 from dissolving tank 1'. Screening part 21 is provided with a perforation, preferably about 30 mm in size, that holds back part of the coarse contaminants and discharges them axially as coarse dirt particles 22. Pre-cleaned pulp P" passes through the perforation and can then be further processed as already described-in connection with FIG. 2.

As already mentioned, coarse screen 2 and screening device 3 can in principle be constructed similarly. Because of their different functions, however, their design must be optimized differently. Their size also differs as a rule. It is frequently advantageous to select the size of upstream coarse screen 2 such that its volume on the inflow side, i.e. the volume in front of screen 6, has at least about 15% of the content calculated by adding up flow 4 through this coarse screen over one minute. The procedure will be somewhat different for determining the size of downstream screening device 3. It is advantageous for the volume on its inflow side to be at least about 30% of the volume calculated from its flow through this machine in one minute. This is based on the requirement that the dirt particles accumulated in the screener must not exceed a certain percentage of the total volume. It must be pointed out thereby that the flow through the downstream screening device is considerably smaller than that through the upstream coarse screen.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A process for disintegration and cleaning of contaminant-containing raw paper stocks, the process comprising:
    producing a contaminant-containing suspension;
    feeding the contaminant-containing suspension to a closed coarse screen;
    drawing of a cleaned flow fraction from the closed coarse screen;
    drawing off an overflow fraction containing an increased amount of contaminants from the coarse screen during at least about 80% of an operating time;
    adjusting a volumetric mass flow of the overflow fraction to at least about 15% and maximally 50% of a volumetric mass flow of an inflow into the coarse screen; and
    feeding the overflow fraction to a screening device, in which contaminants collected are sluiced out discontinuously as a further overflow fraction, thereby forming a further cleaned flow fraction.

2. The process in accordance with claim 1, wherein the contaminant-containing suspension is produced in a disintegration apparatus.

3. The process in accordance with claim 2, wherein the contaminant-containing raw paper stocks comprises waste paper.

4. The process in accordance with claim 1, wherein the overflow fraction is drawn off from the coarse screen at least until no more contaminants are sluiced from the screening device.

5. The process in accordance with claim 1, wherein the flow fraction is continuously drawn off from the coarse screen.

6. The process in accordance with claim 1, wherein the sluicing of contaminants out of the screening device comprises halting the feeding of the overflow fraction into the screening device and, while the feeding is halted, pumping a rinsing jet into the screening device.

7. The process in accordance with claim 6, wherein the rinsing jet causes the contaminants to flow off from the screening device as the further overflow fraction.

8. The process in accordance with claim 1, wherein during the sluicing, the an entire residue collected in the screening device is removed.

9. The process in accordance with claim 1, wherein a discharge of the further cleaned flow fraction from the screening device is blocked from the coarse screen while the sluicing is taking place.

10. The process in accordance with claim 1, wherein the further cleaned flow fraction from the screening device is combined with the cleaned flow fraction from the coarse screen.

11. The process in accordance with claim 1, wherein the further overflow fraction of the screening device is conducted into a screening drum in which a reject fraction is formed as an overflow.

12. The process in accordance with claim 11, wherein the flow fraction through the screening drum is returned into the disintegration apparatus.

13. The process in accordance with claim 1, wherein the further overflow fraction from the screening device is thickened in a press.

14. The process in accordance with claim 1, wherein the volumetric mass flow of the overflow fraction is adjusted at the coarse screen to correspond to between about 20% and about 30% of the volumetric mass flow of the inflow into the coarse screen.

15. The process in accordance with claim 1, wherein the further overflow fraction comprises fibrous material, and a mass flow of the fibrous material in the further overflow fraction is adjusted at the screening device so that it amounts to 20% to 30% of a mass flow of fibrous material in an inflow to the screening device.

16. The process in accordance with claim 1, wherein the coarse screen comprises a screen with an aperture size of maximally 4 mm.

17. The process in accordance with claim 1, wherein the coarse screen comprises a flat screen kept clear by a moving screen scraper.

18. The process in accordance with claim 1, wherein the contaminant-containing suspension is centrally introduced into the coarse screen.

19. The process in accordance with claim 1, wherein heavy particles are separated at the coarse screen via a heavy particle sluice.

20. The process in accordance with claim 1, wherein a breaking apparatus is arranged upstream of the coarse screen to produce the contaminant-containing suspension, and wherein no contaminants are removed between the breaking apparatus and the coarse screen.

21. The process in accordance with claim 1, further comprising rejecting coarse contaminants at a screen perforation of maximally about 30 mm diameter between disintegration apparatus producing the contaminant-containing suspension and the coarse screen.

22. The process in accordance with claim 21, wherein the coarse contaminants are removed with a rotating screening drum having a perforation size of maximally about 30 mm.

23. The process in accordance with claim 1, wherein a disintegration apparatus produces the contaminant-containing suspension.

24. The process in accordance with claim 23, wherein the disintegration apparatus comprises a high-consistency pulper.

25. The process in accordance with claim 24, wherein the high-consistency pulper is operated discontinuously and that at an end of a breaking cycle a desired consistency for the coarse screen is established by adding dilution water.

26. The process in accordance with claim 1, wherein the disintegration apparatus comprises a dissolving tank.

27. The process in accordance with claim 26, wherein an axial continuation of the dissolving tank is structured and arranged as a screening part.

28. The process in accordance with claim 27, wherein the axial continuation of the dissolving tank is utilized as a screening drum.

29. The process in accordance with claim 26, wherein the dissolving tank is operated such that a continuous flow of disintegrated material accumulates, and the accumulated disintegrated material is diluted with dilution water to produce the contaminant-containing suspension.

30. The process in accordance with claim 1, wherein an inside volume on a feed side of the coarse screen is at least about 15% of a volume that the volumetric mass flow of the cleaned flow fraction fills in one minute.

31. The process in accordance with claim 1, wherein an inside volume on a feed side of the screening device is at least about 30% of a volume that a volumetric mass flow of the further cleaned flow fraction fills in one minute.

* * * * *